3,414,554
POLYMERIZATION PROCESS AND CATALYST
Gerald R. Kahle and Charles W. Moberly, Bartlesville, Okla., assignors to Phillips Petroleum Company, a corporation of Delaware
No Drawing. Filed July 6, 1965, Ser. No. 469,874
6 Claims. (Cl. 260—93.7)

ABSTRACT OF THE DISCLOSURE

A catalyst formed by admixing a compound of the formula $R_mMX_n$ wherein R is selected from the group consisting of a saturated acyclic hydrocarbon radical, a saturated cyclic hydrocarbon radical, an aromatic hydrocarbon radical, and combinations thereof, having 1 to 20 carbon atoms, M is a metal selected from the group consisting of aluminum, gallium, indium, and thallium, wherein X is a halogen, $m$ is at least 1 and $m+n$ is 3, a titanium chloride-aluminum chloride complex having the approximate formula $TiCl_3 \cdot \frac{1}{3} AlCl_3$ and iodine when used to polymerize an aliphatic 1-olefin having up to 8 carbon atoms per molecule results in the formation of solid polymers having a higher flexural modulus and a lower xylene-soluble content.

This invention relates to the polymerization of 1-olefins to form solid polymers. In one aspect it relates to an improved catalyst for such a polymerization. In another aspect it relates to a process for producing solid polymers of olefins having improved properties. In still another aspect it relates to a process for producing polypropylene having a higher flexural modulus and a lower content of xylene-soluble material.

It is known in the art to polymerize aliphatic 1-olefine such as propylene to form crystalline solid polymers. Catalysts for such a process are often formed by mixing together a compound having a metal-carbon bond with a compound of a transition metal. Catalysts vary widely in activity and the polymers which they produce also can have widely varying properties. In the production of crystalline polypropylene, it is desirable to obtain not only high yields in the polymerization process but also a polymer which has a flexural modulus of at least 200,000 p.s.i. Very few catalysts, among the many of those proposed in the art, produce polypropylenes having the desired flexural modulus in yields sufficiently high to be economical with a minimum noncrystalline content as measured by the content of xylene-soluble material. While there have been various proposals to modify the activity of catalyst for the formation of the polymer, many of the adjuvants do not achieve desired results without damaging other properties of the polymer.

Thus, an object of this invention is to provide an improved catalyst. Another object of this invention is to produce a polyolefin having a higher flexural modulus value while also having a lower content of xylene-soluble material.

Other objects and advantages will become apparent to those skilled in the art upon considering this disclosure.

According to this invention, the flexural modulus of polypropylene is raised while the content of xylene-solubles is reduced by carrying out the polymerization with a catalyst system formed on mixing (a) a compound of the formula $R_mMX_n$ wherein R is a saturated acyclic hydrocarbon radical, a saturated cyclic hydrocarbon radical, an aromatic hydrocarbon radical, or combinations of these radicals, M is a Group III–A metal (Periodic System of Handbook of Chemistry and Physics, 45th edition, 1964, page B-2), X is a halogen and $m+n$ is 3 and wherein $m$ is at least one, (b) a titanium chloride-aluminum chloride complex, and (c) iodine.

The titanium chloride-aluminum chloride complex used in the invention is formed by reacting titanium tetrachloride with metallic aluminum, and has the approximate formula $TiCl_3 \cdot \frac{1}{3} AlCl_3$.

The olefins which are polymerizable in accordance with the invention are aliphatic olefins having up to 8 carbon atoms per molecule. The greatest benefits are obtained in polymerization of aliphatic 1-olefins having from 3 to 7 carbon atoms per molecule, e.g. propylene, 1-butene, 1-pentene, 1-hexene, and 4-methyl-1-pentene.

In forming the catalyst system of this invention the mol ratio of both the $R_mMX_n$ compound and the iodine to the titanium complex is in the range 0.02:1 to 100:1, preferably 0.1:1 to 10:1. The total catalyst concentration is usually in the range of 0.005 to 10 weight percent of the propylene, but concentrations outside this range are operative.

In admixture with the titanium chloride-aluminum chloride complex and iodine is at least one compound represented by the formula $R_mMX_n$, wherein R preferably is a saturated acyclic hydrocarbon radical, a saturated cyclic hydrocarbon radical, an aromatic hydrocarbon radical, or combinations of these radicals, wherein M is a metal selected from the group consisting of aluminum, gallium, indium, and thallium, and wherein X is a halogen. The $m$ and $n$ are integers and the sum of $m$ and $n$ is equal to 3, the valence of the metal M and $m$ is at least one, the X is a halogen, including chlorine, bromine, iodine and fluorine. The saturated acyclic hydrocarbon radicals, saturated cyclic hydrocarbon radicals, and aromatic hydrocarbon radicals which can be used include hydrocarbon radicals having up to 20 carbon atoms each. Radicals having 10 carbon atoms or less are preferred since the resulting catalyst composition has a greater activity for initiating the polymerization of olefins. Mixtures of one or more of these organometal halide components, such as a mixture of ethyl-aluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_2H_5)_2AlBr$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{10}H_{21}AlCl_2$, $C_{20}H_{41}GaBr_2$, $(C_{14}H_{29})_2GaF$ $(C_6H_5)_2InCl$ (benzene derivative), $C_8H_{17}InF_2$, $(C_6H_{11})InBr_2$ (cyclohexane derivative)

$C_{17}H_{35}AlI_2$, 3-methylcyclohexylaluminum dichloride, 2-cyclohexylethylgallium dichloride, di-(3-phenyl-1-methylpropyl)indium fluoride, 2-(3-isopropylcyclohexyl)ethylthallium dibromide, and the like.

The polymerization is conducted at temperatures in the range 80–250° F., preferably 100–200° F. The pressure is sufficient to maintain the reaction mixture substantially in liquid phase. The reaction time is in the range 10 minutes to 50 hours, more frequently 30 minutes to 10 hours. It is to be understood that reaction conditions recited are for purpose of illustration only and that conditions outside these ranges are also useful with the catalyst of this invention.

The polymerization reaction is carried out either with or without an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. If a diluent is used, the volume ratio of diluent to olefin is in the range 1:1 to 10:1, preferably 3:1 to 7:1.

In addition, it is within the scope of the invention to use hydrogen in a concentration of about 0.08 to 0.30 mol percent of the olefin for controlling the molecular weight of the polymer. When propylene is being polymerized in a mass polymerization system, it is desirable to dissolve this amount of hydrogen in the liquid propylene before passing the propylene into the polymerization reactor.

The product polymers in accordance with this invention can be recovered from the reaction mixture by processes well known in the prior art. Thus the product polymer can be contacted with a chelating compound such as a diketone to remove catalyst residues and further contacted with a hydrocarbon such as n-pentane or liquid propylene to remove remaining traces of catalyst and chelating agent as well as any small amount of polymer fraction which may be soluble in light hydrocarbons at temperatures of the order of 80–100° F.

In the commercial production of polypropylene, it is desirable that the production of noncrystalline polymer, as measured by the xylene-soluble content, be maintained at a low level. One advantage of this invention is that product polymer contains only small amounts of xylene-soluble material.

The following example will further illustrate the invention, although it is not intended that the invention be limited thereto.

EXAMPLE

In a series of runs illustrating specific embodiments of this invention, propylene was polymerized in a mass polymerization system, i.e. as liquid propylene without a diluent. The catalyst was formed by mixing diethylaluminum chloride, iodine and titanium trichloride-aluminum chloride complex in the indicated ratios. One liter of hydrogen at standard temperature pressure (0° C., 760 mm. Hg) was present in the reaction system. The polymer was recovered substantially as hereinbefore described. Each run was carried out in a 1-liter reactor for 2.5 hours at 130° F. and 325 p.s.i.g. with 250 grams propylene.

The following results were obtained:

TABLE

| Run No. | Mol ratio DEAC:$I_2$: Ti complex | Total Catalyst concn, wt. percent[1] | Xylene solubles, wt. percent[2] | Flexural modulus p.s.i.×$10^{-3}$ [3] |
|---|---|---|---|---|
| 1 | 2:2:1 | 0.139 | 5.2 | 220 |
| 2 | 2:1:1 | 0.115 | 4.4 | 228 |
| 3 | 2:0:1 | 0.094 | 8.8 | 173 |

[1] Based on propylene.
[2] Determined by placing 0.95 g. of polymer in a centrifuge tube, adding 95 ml. xylene, heating for 15 minutes at 285° F., cooling, centrifuging, evaporating the solvent from a 25-ml. aliquot of the supernatant liquid, weighing the residue, and multiplying by 400.
[3] ASTM D790–61.

NOTE.—DEAC is diethylaluminum chloride.

The above data indicate that polymer obtained in accordance with this invention has higher flexural modulus and lower xylene-solubles than polymer made in the absence of iodine.

Reasonable variations and modifications of this invention can be made, or followed, in view of the foregoing disclosure, without departing from the spirit or scope thereof.

We claim:

1. A process which comprises polymerizing an aliphatic 1-olefin having up to 8 carbon atoms per molecule in the presence of a catalyst which is formed in mixing a compound of the formula $R_mMX_n$, wherein R is selected from the group consisting of a saturated acyclic hydrocarbon radical, a saturated cyclic hydrocarbon radical, an aromatic hydrocarbon radical, and combinations thereof, having 1 to 20 carbon atoms, M is a metal selected from the group consisting of aluminum, gallium, indium, and thallium, wherein X is a halogen, $m$ is at least 1 and $m+n$ is 3, a titanium chloride-aluminum chloride complex having the approximate formula $TiCl_3 \cdot \frac{1}{3} AlCl_3$ and iodine.

2. A process according to claim 1 wherein the catalyst is formed by mixing diethylaluminum chloride, titanium trichloride-aluminum chloride complex and iodine.

3. A process according to claim 2 wherein the polymerization reaction is carried out in the presence of hydrogen.

4. A process for polymerizing propylene in the presence of a catalyst which forms on mixing a dialkylaluminum chloride wherein the alkyl group contains 1 to 10 carbon atoms, a titanium trichloride-aluminum trichloride complex having the approximate formula $TiCl_3 \cdot \frac{1}{3} AlCl_3$ and iodine, the polymerization being conducted in the liquid phase at a temperature in the range of 80–250° F. and the molar ratio of both the dialkylaluminum chloride compound and iodine to the titanium trichloride-aluminum chloride compound is in the range of 0.02:1 to 100:1.

5. A catalyst which forms on admixing a compound of the formula $R_mMX_n$, wherein R is selected from the group consisting of a saturated acyclic hydrocarbon radical, a saturated cyclic hydrocarbon radical, an aromatic hyrocarbon radical, and combinations thereof, having 1 to 20 carbon atoms, M is a metal selected from the group consisting of aluminum, gallium, indium, and thallium, wherein X is a halogen, $m$ is at least 1 and $m+n$ is 3, a titanium chloride-aluminum chloride complex having the approximate formula $TiCl_3 \cdot \frac{1}{3} AlCl_3$ and iodine.

6. A catalyst which forms on admixing diethylaluminum chloride, titanium trichloride-aluminum chloride complex having the approximate formula $TiCl_3 \cdot \frac{1}{3} AlCl_3$ and iodine.

No references cited.

JOSEPH L. SCHOFER, *Primary Examiner.*

L. EDELMAN, *Assistant Examiner.*